(12) United States Patent
Slawikowski et al.

(10) Patent No.: US 9,499,697 B2
(45) Date of Patent: Nov. 22, 2016

(54) COATING COMPOSITION AND A REFLECTIVE COATING SYSTEM INCLUDING SAME

(75) Inventors: Mark Slawikowski, Brighton, MI (US); Donald J. Algrim, Howell, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 2217 days.

(21) Appl. No.: 12/210,667

(22) Filed: Sep. 15, 2008

(65) Prior Publication Data

US 2009/0087674 A1   Apr. 2, 2009

Related U.S. Application Data

(60) Provisional application No. 60/977,031, filed on Oct. 2, 2007.

(51) Int. Cl.
*B32B 15/04* (2006.01)
*C09D 5/33* (2006.01)
*C09D 5/36* (2006.01)

(52) U.S. Cl.
CPC ............... *C09D 5/004* (2013.01); *C09D 5/36* (2013.01)

(58) Field of Classification Search
None
See application file for complete search history.

(56) References Cited

U.S. PATENT DOCUMENTS

| | | | |
|---|---|---|---|
| 4,029,478 A * | 6/1977 | Lee | 428/659 |
| 4,532,159 A * | 7/1985 | Caldwell et al. | 427/388.4 |
| 4,605,584 A | 8/1986 | Herr, Jr. et al. | 428/142 |
| 4,916,014 A | 4/1990 | Weber et al. | 428/403 |
| 5,202,367 A * | 4/1993 | Hegedus et al. | 524/204 |
| 5,534,598 A * | 7/1996 | Guo | 525/329.2 |
| 5,749,946 A | 5/1998 | Glausch et al. | |
| 6,582,781 B1 * | 6/2003 | Schuhmacher et al. | 428/1.1 |
| 2005/0154082 A1 | 7/2005 | DeLuca, Jr. et al. | |
| 2005/0241530 A1 * | 11/2005 | Bruckner et al. | 106/415 |

FOREIGN PATENT DOCUMENTS

WO   WO 00/75242 A2   12/2000

\* cited by examiner

*Primary Examiner* — Kenneth Stachel
(74) *Attorney, Agent, or Firm* — William E. Kuss; K&L Gatea LLP

(57) ABSTRACT

A coating composition is substantially free from chromate and comprises a resin, a metal salt, and an interference pigment. The interference pigment includes mica which has a solar reflective coating disposed thereon. A reflective coating system comprises a cured film formed from the coating composition disposed on a substrate. The cured film has a transparency of at least 75%, as measured according to ASTM 1746. In addition, the cured film has a solar reflectivity of at least 55%, as measured according to ASTM E 1918 and ASTM E 903. The cured film has excellent corrosion resistance properties and adhesion to the substrate.

27 Claims, No Drawings

COATING COMPOSITION AND A REFLECTIVE COATING SYSTEM INCLUDING SAME

RELATED APPLICATIONS

This patent application claims priority to and all advantages of U.S. Provisional Patent Application No. 60/977,031, which was filed on Oct. 2, 2007.

FIELD OF THE INVENTION

The present invention generally relates to a coating composition and, more specifically, to a reflective coating system including a cured film that is formed from the coating composition and disposed on a substrate. The cured film is transparent and has excellent solar reflectivity and corrosion resistance.

DESCRIPTION OF THE RELATED ART

Coil coating compositions are known in the art and are typically applied to a substrate, e.g. a metal substrate, to form a cured film prior to an end use of the substrate. Typical end uses of the substrate include appliances, automotive parts and assemblies and architectural applications. More specifically, the coil coating compositions are commonly utilized when the substrate is utilized in an architectural application, such as roofing or a gutter, in a residential or a commercial building. The cured film is employed to provide both aesthetic and energy conservation properties to the substrate and, when the substrate is the metal substrate, the cured film is also employed to passivate the metal substrate, thereby providing resistance to corrosion.

The selection of the coil coating composition is dependent upon many desired characteristics and properties of the cured film formed from the coil coating composition, such as solar reflectivity properties, emissivity properties, anti-corrosion properties, anti-weathering properties, ultraviolet protection properties and aesthetics.

Solar reflectivity is typically referred to as an albedo ($\alpha$) value and is generally a measure of an ability to reflect sunlight, including visible, infrared, and ultraviolet wavelengths of the sunlight. The albedo value is a ratio of reflected solar radiation flux to incident flux and quantified as a value of from 0.0 to 1.0. An albedo value of 0.0 denotes a total absorption of the sunlight while an albedo value of 1.0 signifies a total reflectivity of the sunlight. To qualify as Energy Star efficient under Environmental Protection Agency guidelines, the albedo value must be greater than or equal to 0.65 for roofing having no substantial slope (typically commercial buildings), and greater than or equal to 0.25 for roofing having a slope (typically residential buildings). When the albedo value is high, e.g. approaching 1.0, a thermal gain of the residential or commercial building due to exposure to sunlight is reduced. Thermal gain is a temperature increase within the building on which the roofing is located, which is caused when the roofing does not reflect sunlight, or solar radiation. Therefore, it is advantageous for cured films formed from the coil coating composition to have a high albedo value, and thus a maximized solar reflectivity.

Emissivity ($\epsilon$) is generally a measure of energy radiation. Emissivity is typically defined as a ratio of energy radiated by an object to energy radiated by a black body at the same temperature and is quantified as a value of from 0.0 to 1.0. A black body is an object that absorbs all electromagnetic radiation that strikes the black body, i.e., the black body does not reflect electromagnetic radiation. The emissivity of most metals is typically low, e.g. approximately 0.20 for aluminum. While there is no emissivity standard mandated by the Environmental Protection Agency for an Energy Star rating, the emissivity of roofs of residential or commercial buildings is preferably high, e.g. approaching 1.0, to reduce the thermal gain in the residential or commercial building from the sunlight. As such, it is advantageous to maximize the emissivity of cured films formed from coil coating compositions. When the emissivity of the cured films is maximized, the costs to cool the residential and/or commercial building are reduced. In addition, when the emissivity is maximized, a "heat island" effect is reduced, which causes increased temperatures in urban locations.

Coil coating compositions typically include a resin, a cross-linking agent, a solvent (or water), and one or more additive components contingent on physical properties desired of the cured film formed from the coil coating composition. The resin is usually selected based upon consideration for resistance to weathering, chemicals, dirt, and other natural elements while remaining flexible when formed into the cured film.

Chromate is typically included in coil coating compositions and aids in passivation of the metal substrate. Chromate is a strong oxidizing agent and, in the presence of water, forms insoluble compounds that prevent and chemisorptively bind corrosion-promoting ions, thereby protecting the metal substrate from corrosion. Chromate also imparts the coil coating composition, as well as the cured film formed therefrom, with excellent adhesion to the metal substrate. Excellent adhesion of the cured film to the metal substrate is difficult to attain when the metal substrate is formed from certain metals. However, chromate is a volatile organic compound (VOC) and is potentially carcinogenic. As such, there is a need for safer alternatives with similar desirable properties to those of chromate.

In addition to chromate, the coil coating compositions typically include a color pigment, which is employed to adjust functional and aesthetic aspects of the coil coating compositions and the cured films formed therefrom. When the color pigment is incorporated into the coil coating compositions, the color pigment typically imparts the cured films formed from the coil coating compositions with a color. When the end use of the metal substrate is roofing, the color is typically selected for aesthetic reasons, because it is often desirable for roofing to have a particular color and match other structures of the commercial or residential buildings. However, the color has a functional justification as well, because when the color of the cured film is lighter, the roofing will have a higher albedo value and, thus, reduced thermal gain. The color pigment of the coil coating contributes to an opacity of the cured film formed therefrom, which inhibits the appearance of the metal substrate from exhibiting through the cured film. However, in several applications, such as roofing for commercial buildings, it may be desirable to retain the appearance of the metal substrate.

When the cured films are transparent, the roofing is protected from corrosion and weathering. However, traditional cured films that are transparent do not have a high albedo value or solar reflectivity and, as such, contribute to increased costs to cool the commercial building on which the roofing is located.

In view of foregoing, it would be advantageous to provide an improved coating composition that can be applied to a substrate to form a cured film having a solar reflectivity such that the cured film meets Energy Star efficiency standards. It would be further advantageous to provide an improved coating composition addressing the deficiencies set forth above.

SUMMARY OF THE INVENTION AND ADVANTAGES

The present invention provides a coating composition. The coating composition is substantially free from chromate, and comprises a resin, a metal salt, and an interference pigment. The interference pigment comprises mica having a solar reflective coating disposed thereon. This invention also provides a reflective coating system comprising a cured film formed from this coating composition. In this reflective coating system, the cured film is disposed on a substrate and has a transparency of at least 75%, as measured according to ASTM 1746.

The coating composition of the present invention is substantially free from chromate yet still has substantially similar physical properties to conventional coating compositions which do include chromate, including excellent adhesion to the substrate and corrosion resistance. The coating composition forms a cured film that is transparent, as noted above. As such, the substrate of the reflective coating system retains the appearance of the substrate even with the cured film disposed thereon.

DETAILED DESCRIPTION OF THE INVENTION

The present invention provides a coating composition. The coating composition may be applied on a substrate to form a cured film. The present invention also provides a reflective coating system, which comprises the cured film formed from the coating composition disposed on the substrate. The reflective coating system may be used in applications including, but not limited to, automotive parts and assemblies, Venetian blinds, and architectural applications. In particular, the reflective coating system is particularly useful in architectural applications, such as roofing for a residential and/or commercial building. The cured film imparts the substrate with aesthetic qualities, protection, and excellent energy efficiency properties, which are described additionally below. The coating composition of the present invention is particularly useful as a coil coating composition. A Coil coating compositions is typically applied to a metal substrate. The metal substrate is typically in coil form, and is unwound prior to application of the coil coating compositions thereon to form the cured film. Once the cured film has been formed on the metal substrate, the metal substrate is typically wound back up in the coil form. However, it is to be appreciated that the coating composition may be used in other applications, such as in automotive coatings, without departing from the scope of the present invention.

As set forth above, the substrate is typically a metal substrate. In certain embodiments, the metal substrate is further defined as steel. The steel of the metal substrate may have a coating disposed thereon. One example of the coating that may be disposed on the steel of the metal substrate is an aluminum-zinc alloy. A particular example of steel having the coating of the aluminum-zinc alloy disposed thereon is Galvalume®. The metal substrate may also comprise steel having a zinc coating disposed thereon, which is commonly referred to in the art as "galvanized" steel. Further, the metal substrate may comprise steel, such as stainless steel. However, it is to be appreciated that any metal or alloy may be used as the metal substrate for purposes of the present invention. It is to be further appreciated that the substrate is not limited to the metal substrate; the substrate may comprise any material, such as plastics, glass, fiber, etc.

The coating composition is substantially free from chromate. The terminology "substantially free", as used herein in reference to the chromate, means that the amount of chromate present in the coating composition is sufficiently low so as to avoid any undesired adverse impact with respect to a toxicity of the coating composition. Typically, the amount of chromate present in the coating composition is less than 5, typically less than 0.5, more typically less than 0.1, and most typically zero, percent by weight based on the total weight of the coating composition.

The coating composition comprises a resin. The resin is typically self-crosslinking. Alternatively, the coating composition may further comprise a cross-linking agent reactive with the resin. The resin may be selected from the group of acrylics, epoxies, fluorocarbons, polyesters, siliconized polyesters, plastisols, urethanes, and combinations thereof. In addition, the resin may be a solventborne resin or a waterborne resin. The resin is typically present in the coating composition in an amount of from about 40 to about 95, more typically from about 40 to about 55 percent by weight based on the total weight of the coating composition.

In one embodiment of the present invention, the resin is an acrylic resin. As set forth above, the acrylic resin may be a solventborne resin or a waterborne resin. For the solventborne resins, the solvent may be, for example, methyl n-Amyl ketone, n-butyl acetate, t-butyl acetate, xylene, acetone, and the like. The water or solvent is typically present in the coating composition in an amount of from about 25 to 45 percent by weight based on the total weight of the coating composition. In one particular embodiment of the present invention, the resin is a waterborne acrylic resin. The waterborne acrylic resin is typically self-crosslinking.

The acrylic resin typically has a number average molecular mass, $M_n$, of from greater than zero to about 500,000 g/mol. The acrylic resin typically has a weight average molecular mass, $M_w$, of from about 200 to about 500 g/mol. Suitable acrylic resins may be formed by reacting acrylic acid with an alcohol to form a carboxylic ester. The carboxylic ester may combine with itself or other monomers to form the acrylic resin, which may be a homopolymer.

As set forth above, the coating composition may further include the cross-linking agent. However, as also set forth above, the resin may be self cross-linking, in which case no cross-linking agent is required. When the resin is the waterborne acrylic resin, the resin is typically self-crosslinking and the cross-linking agent is not required. Examples of suitable cross-linking agents for the purposes of the present invention include, but are not limited to, melamine resins such as monomeric and/or polymeric melamine formaldehyde resins, including both partially and fully alkylated melamines, such as other methylated melamines, butylated melamines, and methylated/butylated melamines. The melamine formaldehyde resin may include alkoxymethyl groups of the general formula:

wherein $R_1$ is an alkyl chain having from 1 to 20 carbon atoms. One specific example of the melamine formaldehyde resin suitable for including in the cross-linking agent, for the purposes of the present invention, is hexamethoxymethyl melamine, commercially available under the tradename Resimene®, from Solutia of St. Louis, Mo. The cross-linking agent can also include other aminoplasts including, but not limited to, urea resins such as methylol ureas and alkoxy ureas, e.g. butylated urea formaldehyde resin. The cross-linking agent may include other cross-linking agents known in the art including, but not limited to, epoxy resins, oxazoline resins, block isocyanates, methylated urea, butylated urea, methylated/butylated urea, and combinations thereof. When utilized, the cross-linking agent is typically present in the coating composition in an amount of from about greater than zero to about 20 percent by weight based on the total weight of the coating composition.

The coating composition further comprises an interference pigment. The interference pigment may be mixed with the other components of the coating composition in any manner, and order of addition is not significant for the purposes of the present invention. For example, the interference pigment may be added directly to the resin and the cross linking component under agitation.

The interference pigment includes mica. The mica of the interference pigment has a solar reflective coating disposed thereon. It is to be appreciated that the solar reflective coating typically encapsulates the mica. The solar reflective coating may be disposed on the mica to form the interference pigment by numerous methods, such as by precipitation. It is to be further appreciated that the interference pigment may include more than one solar reflective coating layer disposed on the mica.

The interference pigment typically transmits at least 60% of all wavelengths in the range of from 250 to 2,500 nm and less than 50% of solar energy. More specifically, the interference pigment is typically translucent and colorless. As used herein, the term "colorless" is defined to mean that the interference pigment does not have a color. The term "colorless" is further defined to mean that the absorption curve for the interference pigment is devoid of absorption peaks in the 400-700 nm range and does not present a tint or hue in reflected or transmitted light when viewed under sunlight conditions. The interference pigment is also typically translucent. As used herein, the term "translucent" is defined to mean that light passes through the interference pigment diffusely. Without intending to be limited by theory, it is believed that the colorless translucence of the interference pigment contributes to a high solar reflectivity value of the cured film formed from the coating composition, as described in further detail below.

As set forth above, the interference pigment includes mica, which has a solar reflective coating disposed thereon. The solar reflective coating of the interference pigment comprises an inorganic oxide. The inorganic oxide is typically selected from the group of metal oxides, silicon oxides, and combinations thereof. The metal oxides may include any metal oxide known in the art. Suitable metal oxides include, but are not limited to, titanium dioxide, tin oxide, zirconium oxide, and combinations thereof. The silicon oxides may include any silicon oxide known in the art. For example, in one embodiment, the silicon oxides may be further defined as silicon dioxide. For ease of addition to the coating composition, the interference pigment typically has a particle size of from 10 to 60 µm as measured in accordance with ISO 1524. It is to be appreciated that the particle size of the interference pigment is in reference to the length of the interference pigment because the interference pigment, like the mica included therein, typically has a platelet shape, i.e., the interference pigment is not spherical. Suitable interference pigments for the purposes of this invention include those commercially available under the trade name Solarflair®, from Merck KGaA of Darmstadt, Germany. The interference pigment is typically present in the coating composition in an amount of from greater than zero to 15, more typically from 2 to 10, percent by weight based on the total weight of the coating composition.

The coating composition further comprises a metal salt, which passivates the cured film formed from the coating composition, thereby providing resistance to corrosion. The metal salt is a metal salt other than those which comprise chromate. The metal salt is typically further defined as zinc phosphate. Zinc phosphate prevents corrosion of the metal substrate by ameliorating defects in the cured film. More specifically, the zinc phosphate converts primary corrosion products which form in defects of the cured film into a solid, water-stable compound. The zinc phosphate also bonds hydroxyl ions to form slightly soluble compounds, thereby effectively filling defects in the cured film and preventing corrosion of the metal substrate.

In certain embodiments, the coating composition further comprises a second metal salt which, together with the zinc phosphate, provides even greater corrosion resistant properties to the cured film formed from the coating composition than the zinc phosphate alone. The second metal salt is a metal salt other than those which comprise chromate. It is to be appreciated that the second metal salt may include more than one metal salt, i.e., a blend of metal salts. Examples of second metal salts suitable for the purposes of the present invention include, but are not limited to, calcium metal salts such as calcium phosphate, metal phosphocarbonates, metal phosphosilicates, and combinations thereof. The second metal salt has been found to act synergistically with the zinc phosphate, thereby improving corrosion resistance of the cured film as compared to when zinc phosphate is used alone. The metal salt and the second metal salt impart the cured film formed from the coating composition with excellent adhesion to the metal substrate and excellent weathering properties, with performance substantially imitating that of chromate. The coating composition including the metal salt and second metal salt typically has a life span of five years attributable to excellent weathering properties. Typically, both the metal salt and the second metal salt have a particle size of about 0.5 nm. Each of the metal salt and the second metal salt is typically colorless. The metal salt and the second metal salt is typically present in the coating composition in a combined amount of from 0.01 to 10, more typically from 4 to 10, most typically from 5 to 10 percent by weight based on the total weight of the coating composition. Additionally, on an individual basis, the zinc phosphate is typically included in the coating composition in an amount of from 0.01 to 5 percent by weight based on the total weight of the coating composition, and the second metal salt is typically included in the coating composition in an amount of from 0.01 to 5 percent by weight based on the total weight of the coating composition.

It is to be appreciated that, although not required, the coating composition of the present invention is typically substantially free from color pigments other than the interference pigment. Color pigments include conventional organic and inorganic color pigments, which are traditionally utilized in coating compositions to introduce a particular color to the cured film formed from the coating composition. When the coating composition is free from color pigments, the cured film formed from the coating composition is sufficiently transparent, which is desirable for the purposes of the present invention and is objectively quantified below. However, it is to be appreciated that the coating composition of the present invention may form a conventional tinted cured film, which has a slight pigmentation, without departing from the scope of the present invention so long as the conventional tinted cured film is sufficiently transparent, as described in greater detail below. The coating composition typically comprises color pigments in an amount of less than 5, typically less than 1, more typically less than 0.5, and most typically zero, percent by weight based on the total weight of the coating composition.

The coating composition may further comprise an additive component. Typical additive components may include additives selected from the group of flattening or matting agents, biocides, waxes, surfactants, fillers, plasticizers, emulsifiers, texturizers, catalysts, thickeners, adhesion promoters, stabilizers, defoaming agents, wetting additives, and combinations thereof. When present, the additive component is typically present in the coating composition in an amount of from greater than zero to 5 percent by weight based on the total weight of the coating composition.

To form the cured film on the metal substrate, the coating composition is applied to the metal substrate. The coating composition may be applied to the substrate in any manner known in the art, such as spray application, roll application, dipping application, and the like In certain embodiments, the coating composition is typically applied to the metal substrate using at least one roller. In one embodiment, a first roller transfers the coating composition from an open holding receptacle to a second roller, and the second roller applies the coating composition to the metal substrate. As alluded to above, it is to be appreciated that other methods of applying the coating composition to the metal substrate may be employed.

Once the coating composition has been applied to the metal substrate as described above, the coating composition is typically cured on the metal substrate in an oven to form the reflective coating system. The coating composition is typically cured in the oven at a temperature of from 700° F. to 900° F. for a period of time of from 20 to 100 seconds. When the oven is heated to the temperature of from 700 to 900° F. for the period of time set forth above, the metal substrate typically attains a temperature of from 150 to 500° F. while in residence in the oven. It is to be appreciated that although the step of curing the coating composition typically occurs in an oven, the coating composition may also be cured using other techniques and equipment, such as an open heat source. Once the coating composition is cured to form the cured film, the cured film is cooled to about ambient temperature. The cured film on the metal substrate may be sprayed with a coolant, such as water, to effect the cooling. Alternatively, the cured film may be cooled to the ambient temperature without the use of a coolant.

The cured film typically has a film build of from 0.1 to 0.3 mils. It is to be appreciated that the physical properties of the cured film that are objectively quantified below are a function of the film build of the cured film. The physical properties that are objectively quantified are for the range of the film build set forth above, though the physical properties may fall within the described ranges even when the film build is greater or less than the film build set forth above. The cured film of the reflective coating system, which is formed from the coating composition, typically has a solar reflectivity value of greater than 55%, more typically greater than 65%, as measured according to ASTM E 1918 and/or ASTM E 903. The cured film of the reflective coating system typically has an emissivity of greater than 0.75, more typically greater than 0.80, at all wavelengths in the range of from 250 to 2,500 nm as measured in accordance with ASTM E 408 and ASTM C 1371. Further, the cured film typically has an ultraviolet absorbance of about 70 as measured in accordance with ASTM E 903. The cured film of the reflective coating system has a transparency of at least 75%, more typically at least 85%, as measured according to ASTM 1746. It is to be appreciated that although ASTM 1746 is typically utilized to determine clarity of a plastic, it can be used to determine transparency of a cured film as well. The transparency of the cured film leaves the appearance of the metal substrate unobscured while still protecting the metal substrate with the cured film. In other words, the metal substrate of the reflective coating system retains a metallic appearance while having an excellent solar reflectivity and emissivity. In addition, the metal substrate of the reflective coating system has excellent corrosion resistant properties.

The following examples, illustrating the method of forming the coating composition of the present invention, are intended to illustrate and not to limit the invention.

EXAMPLES

A coating composition is prepared by conventional loading and mixing procedures. In a first example, a base composition is prepared by adding ammonia to an acrylic resin to form a mixture. The pH of this mixture is adjusted to about 8.5. The remaining components, which are listed in the table below, are then added, thereby yielding the base composition including the following components, wherein the corresponding weight percentage of each component in the base composition is based on the weight of the base composition prior to the addition of a metal salt:

| Component | Wt. % |
| --- | --- |
| Resin | 93.53 |
| Ammonia | 0.04 |
| Solvent | 0.99 |
| Interference Pigment | 1.98 |
| Deionized water | 0.99 |
| Additive A | 0.99 |
| Additive B | 0.99 |
| Additive C | 0.49 |

Resin is a self-crosslinking waterborne acrylic resin, commercially available from BASF Corp. of Florham Park, N.J.

Solvent is butyl carbitol.

Interference pigment comprises mica which has a metal oxide coating disposed thereon as the solar reflective coating and is commercially available from Merck KGaA of Darmstadt, Germany.

Additive A is a defoamer.

Additive B is an associative thickener.

Additive C is a biocide.

Various metal salts are added to the base composition to form the coating composition. The various metal salts, and resulting properties of cured films formed from coating compositions including the base composition above and the various metal salts, are described below. The coating composition is then applied onto a Galvalume® substrate to form the cured film having a thickness of from about 0.1 to 0.3 mils.

Tests are conducted on cured films formed from samples of the coating composition including the various metal salts to determine corrosion resistant properties as measured by an ASTM B117 salt spray test. Corrosion resistant properties are considered a "pass" when the creep from the scribe is about 1/16 in. or less, "borderline" when the creep from the scribe is about ⅛ in. to about 1/16 in., and a "fail" when the creep from the scribe is greater than ⅛ in.

The following samples (Samples 1-A through 5-A) illustrate the instant invention and use a combination of metal salts. In particular, Metal Salt B is included in each of the samples in a weight percentage of 2.5% of the total weight of the coating composition, and the other metal salts are varied in the amounts listed in the table, which amounts represent percent by weight based on the total weight of the coating composition.

| Component | Sample 1-A | Sample 2-A | Sample 3-A | Sample 4-A | Sample 5-A |
|---|---|---|---|---|---|
| Metal Salt A | 2.5 | | | | |
| Metal Salt B | 2.5 | 2.5 | 2.5 | 2.5 | 2.5 |
| Metal Salt C | | 2.5 | | | |
| Metal Salt D | | | 2.5 | | |
| Metal Salt E | | | | 2.5 | |
| Metal Salt F | | | | | 2.5 |
| ASTM B117 | Pass | Pass | Pass | Pass | Pass |

Metal Salt A is a calcium phosphate commercially available from Halox of Hammond, Ind.

Metal Salt B is a zinc phosphate commercially available from Halox.

Metal Salt C is a calcium-enriched silica commercially available from Halox.

Metal Salt D is a mixed metal phosphocarbonate commercially available from Halox.

Metal Salt E is a mixed metal phosphocarbonate commercially available from Halox.

Metal Salt F is a mixed metal calcium phosphosilicate commercially available from Halox.

COMPARATIVE EXAMPLES

The following comparative samples represent comparative examples of cured films formed from coating compositions that are similar to the coating compositions of the instant invention, but include a single metal salt rather than a combination of metal salts. Again, tests are conducted on cured films formed from samples of the coating composition including the various metal salts to determine corrosion resistant properties as measured by an ASTM B117 salt spray test. Corrosion resistant properties are considered a "pass" when the creep from the scribe is about 1/16 in. or less, "borderline" when the creep from the scribe is about ⅛ in. to about 1/16 in., and a "fail" when the creep from the scribe is greater than ⅛ in.

| Component | Comparative Sample 1 | Comparative Sample 2 | Comparative Sample 3 | Comparative Sample 4 | Comparative Sample 5 | Comparative Sample 6 |
|---|---|---|---|---|---|---|
| Metal Salt A | 5 | | | | | |
| Metal Salt B | | 5 | | | | |
| Metal Salt C | | | 5 | | | |
| Metal Salt D | | | | 5 | | |
| Metal Salt E | | | | | 5 | |
| Metal Salt F | | | | | | 5 |
| ASTM B117 | Borderline | Borderline | Fail | Fail | Fail | Fail |

As is clear, when comparison is made between the samples that represent the present invention and the comparative samples, enhanced corrosion resistance is achieved when a combination of metal salts, including the zinc phosphate and a second metal salt. This is even the case when comparison is made between samples of the present invention and the comparative sample including only zinc phosphate, with the metal salt present in the respective samples at the same weight percentage based on the weight of the coating composition.

The present invention has been described herein in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described above.

What is claimed is:

1. A coating composition which forms a cured film having a transparency of at least 75% as measured according to ASTM 1746, and a solar reflectivity of at least 55% as measured according to ASTM E 1918 and ASTM E 903, wherein said coating composition is substantially free from chromate and comprises:
   a self-crosslinking resin;
   zinc phosphate; and
   an interference pigment which comprises mica having a solar reflective coating disposed thereon.

2. A coating composition as set forth in claim 1 wherein the transparency of the cured film formed from said coating composition is at least 85%, as measured according to ASTM 1746.

3. A coating composition as set forth in claim 1 wherein said resin is further defined as an acrylic resin.

4. A coating composition as set forth in claim 3 wherein said acrylic resin comprises a waterborne acrylic resin.

5. A coating composition as set forth in claim 4 wherein said waterborne acrylic resin is further defined as a self-crosslinking waterborne acrylic resin having a weight average molecular mass of 200 to 500 g/mol.

6. A coating composition as set forth in claim 1 wherein said solar reflective coating of said interference pigment comprises an inorganic oxide.

7. A coating composition as set forth in claim 6 wherein said inorganic oxide is selected from the group of silicon oxides, metal oxides, and combinations thereof.

8. A coating composition as set forth in claim 7 wherein said metal oxides are selected from the group of titanium oxide, tin oxide, zirconium oxide, and combinations thereof.

9. A coating composition as set forth in claim 1 further comprising a second metal salt.

10. A coating composition as set forth in claim 9 wherein said second metal salt is selected from the group of calcium metal salts, metal phosphocarbonates, metal phosphosilicates, and combinations thereof.

11. A coating composition as set forth in claim 1 wherein said coating composition is free from color pigments other than said interference pigment.

12. A coating composition as set forth in claim 1, comprising (based on total weight of the coating composition):
40 to 95% of the self-crosslinking resin;
0.01 to 5% of the zinc phosphate;
greater than zero to 15% of the interference pigment; and
25 to 45% water or solvent.

13. A reflective coating system comprising: a cured film disposed on a substrate and having a transparency of at least 75% as measured according to ASTM 1746, and a solar reflectivity of at least 55% as measured according to ASTM E 1918 and ASTM E 903 wherein said cured film is formed from a coating composition which is substantially free from chromate and comprises:
a self-crosslinking resin;
zinc phosphate; and
an interference pigment which comprises mica having a solar reflective coating disposed thereon.

14. A reflective coating system set forth in claim 13 wherein said transparency of said cured film is at least 85%, as measured according to ASTM 1746.

15. A reflective coating system as set forth in claim 13 wherein said cured film has a solar reflectivity of at least 65%, as measured according to ASTM E 1918 and ASTM E 903.

16. A reflective coating system as set forth in claim 13 wherein said substrate is further defined as a metal substrate.

17. A reflective coating system as set forth in claim 6 wherein said metal substrate is further defined as steel.

18. A reflective coating system as set forth in claim 16 wherein said metal substrate is further defined as steel having a coating of an aluminum-zinc alloy disposed thereon.

19. A reflective coating system as set forth in claim 13 wherein the resin of the coating composition comprises an acrylic resin.

20. A reflective coating system as set forth in claim 13 wherein the solar reflective coating of the interference pigment of the coating composition comprises an inorganic oxide.

21. A reflective coating system as set forth in claim 20 wherein the inorganic oxide of the solar reflective coating is selected from the group of silicon oxides, metal oxides, and combinations thereof.

22. A reflective coating system as set forth in claim 21 wherein the metal oxides of the solar reflective coating are selected from the group of titanium oxide, tin oxide, zirconium oxide, and combinations thereof.

23. A reflective coating system as set forth in claim 13 wherein the coating composition further comprises a second metal salt which is selected from the group of calcium metal salts, metal phosphocarbonates, metal phosphosilicates, and combinations thereof.

24. A reflective coating system as set forth in claim 13, wherein the coating composition comprises (based on total weight of the coating composition):
40 to 95% of the self-crosslinking resin;
0.01 to 5% of the zinc phosphate;
greater than zero to 15% of the interference pigment; and
25 to 45% water or solvent.

25. A coating composition which forms a cured film having a transparency of at least 75% as measured according to ASTM 1746, and a solar reflectivity of at least 65% as measured according to ASTM 1918 and ASTM E 903, wherein said coating composition is substantially free from chromate and comprises:
a self-crosslinking waterborne acrylic resin;
0.01 to 5% zinc phosphate based on total weight of the coating composition;
0.01 to 5% of a second metal salt based on total weight of the coating composition; and
an interference pigment which comprises mica having a solar reflective coating comprising silicon oxide disposed thereon.

26. A coating composition as set forth in claim 25 wherein the second metal salt comprises a metal phosphocarbonate and/or a metal phosphosilicate.

27. A coating composition as set forth in claim 25, comprising (based on total weight of the coating composition):
40 to 95% of the self-crosslinking resin;
0.01 to 5% of the zinc phosphate;
0.01 to 5% of the second metal salt;
greater than zero to 15% of the interference pigment; and
25 to 45% water or solvent.

* * * * *